United States Patent Office 2,769,990
Patented Nov. 13, 1956

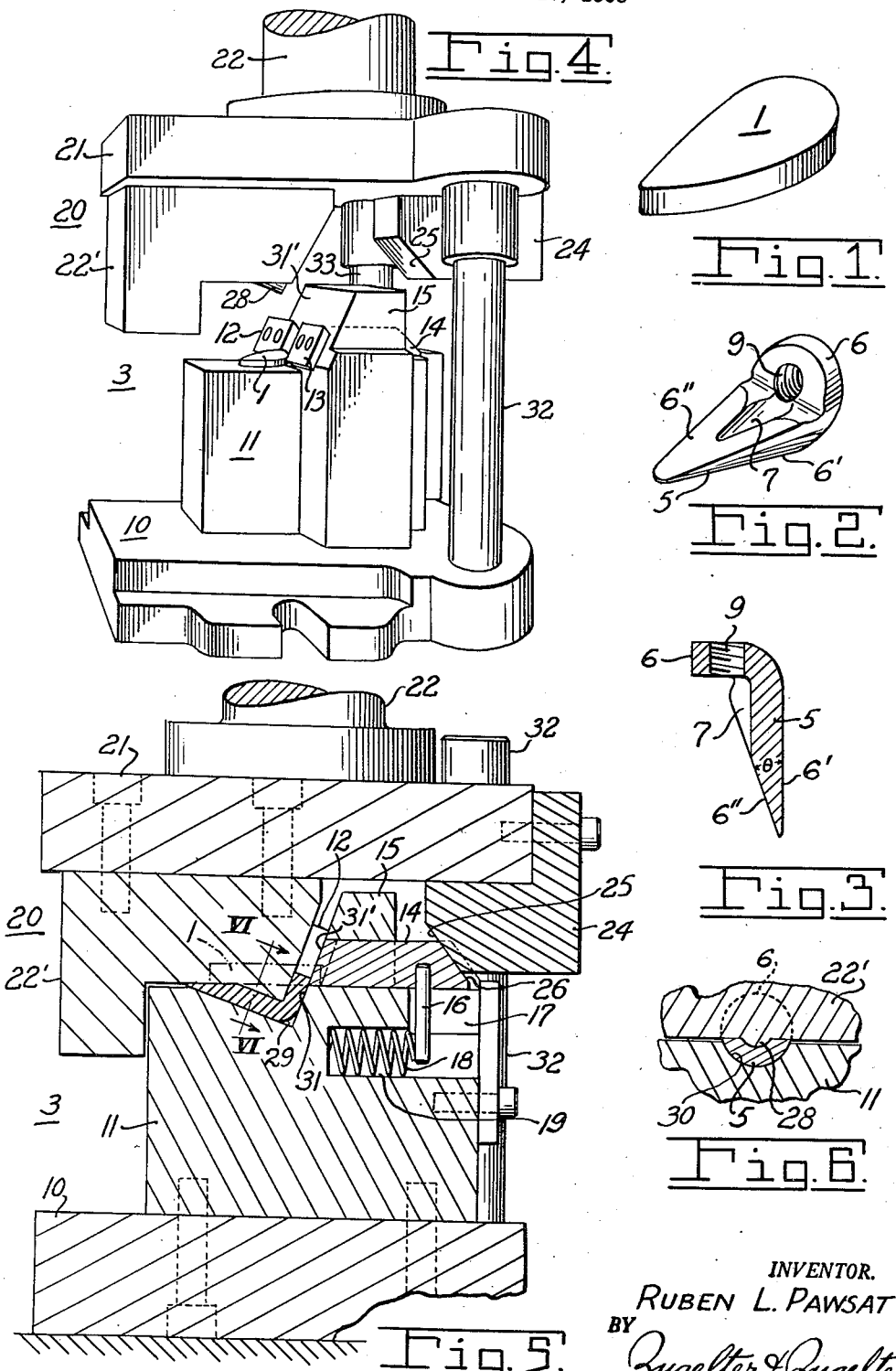

2,769,990

WEDGE NUT FORGING MACHINE

Ruben L. Pawsat, Maysville, Ky.

Application June 15, 1953, Serial No. 361,571

1 Claim. (Cl. 10—76)

This invention relates to wedge nuts for the steering posts of bicycles.

Heretofore, wedge nuts for bicycles have been made of cast iron.

An object of this invention is to provide a wedge nut made of steel, and which is strong, tough and durable.

Another object of this invention is to provide a method of forming a wedge nut of steel from a single flat blank.

A still further object of the invention is to form the wedging surface and the nut as an integral part, and to form, in one face of the nut, a groove for accommodating the wedge bolt.

A still further object of the invention is to provide a die that will form the wedge nut of this invention in one operation.

Other objects of the invention will be apparent to those of ordinary skill in this art to which the invention pertains from the following description and drawings.

In the drawings:

Figure 1 is a view in perspective of a blank from which the wedge nut of this invention is formed;

Fig. 2 is a view in perspective of the finished wedge nut;

Fig. 3 is a view in section of the wedge nut shown at Fig. 2;

Fig. 4 is a view in perspective of a compound die for forming the wedge nut of Figs. 2 and 3 in one operation, the die being in open position with a blank therein;

Fig. 5 is a view in section of the die shown in Fig. 1, the die being in closed position, a movable die section being shown in dot-dash lines in its released position, a blank being shown in unformed position in double dot-dash lines; and Fig. 6 is a view in section taken on line VI—VI of Fig. 5.

The wedge nut of this invention is made from a blank 1 such as shown in Fig. 1. The blank 1 is of tear drop shape in plan view and of uniform thickness from one end to the other. The nut is formed by placing the blank 1 in the compound die 3 of Figs. 4 and 5 and formed in one operation to the shape shown in Fig. 2.

As shown in Figs. 2 and 3, the wedge nut has a wedge portion 5 and a nut portion 6, disposed at substantially right angles to the portion 5. The portion 5 is coined in the die so as to form a wedge having an outer cylindrical face 6' and the inner flat wedge face 6'', which is disposed at an angle θ to the outer face. When the blank 1 is placed in the die, a groove 7 is formed in the wedge face 6''. When the wedge nut has been formed in the die, the nut portion is pierced at 9 and threaded to accommodate the wedge bolt (not shown) usually provided for steering posts.

The die for forming the wedge nut shown in Figs. 2 and 3 is illustrated in detail in Figs. 4 and 5. The die comprises a stationary bed or base 10, on which the lower, or stationary die 11 is mounted. On the top of the die 11 are mounted a pair of spaced stationary guide members 12 and 13, between which the large end of the tear drop blank 1 is received. The lower die 11 also includes a movable die section 14, that slides from right to left, as seen in Figs. 4 and 5. Die member 14 is held in place on the stationary die support 11, by a yoke 15 that straddles the movable die element 14. Die element 14 is provided with a pin 16, that extends downwardly into an opening 17 in the base 11. Pin 16 works against a compression spring 18, disposed in a socket 19 in die member 11. Spring 19 urges the die member 14 to the right, as seen in Fig. 5.

The die 3 also includes an upper or movable die 20. Die 20 includes a base or plate 21, that is secured to a die plunger 22. To the under side of member 21 is secured a die element 22'. The die element 22' co-operates with the portion of the die in which the wedge-shaped portion of the blank 1 is formed. A pusher 24 is secured to member 21, and is disposed to actuate the movable die element 14 from right to left, as seen in Fig. 5, as the upper die assembly is moved downwardly to forming or closed position. In order to effect this movement of die element 14, the inner face of member 24 is provided with an inclined face 25, that co-operates with a similarly inclined face 26 at the outer end of a die element 14.

Die member 22' is provided with a partly round or approximately half-round portion 28, that extends longitudinally of the nut blank 1, from a point corresponding to the location of the inner face of nut 6, and to a point where the bottom of the groove 7 runs out into the tapered face 6'' of the wedge nut.

Die member 11 is provided with a cavity 29 into which the blank is forced by the partly round portion 28. The cavity 29 has a sloping face 30 (Fig. 6) of partly or half-round cross-section, as shown in Fig. 6, and an end wall 31 (Fig. 5) forming a right angle with the axis of the sloping face.

To form the wedge nut shown in Figs. 2 and 3, the blank shown in Fig. 1 is laid on the lower die between the guides 12 and 13, as shown in Fig. 4. The upper die member is then moved downwardly, and as it approaches the blank 1, the die face on the part 22' forces the wedged or tapered part of the blank into cavity 29, in the die member 11. At the same time, the pusher 24 engages the inclined face 26 on element 14, forcing it from the dot-dash position of Fig. 5 to the full-line position in which the left hand face 31' of element 14 is aligned with end wall 31 of the cavity and causing the large end of the blank 1 to be bent at substantially right angles to the outer face of the wedged part 5. When the die strikes home, or seats, the portion 28 forms the bolt groove 7. The wedge face 6'' of the nut is formed by the action of the dies coining the metal and causing it to flow to the shape shown in Figs. 2 and 3.

As shown in Fig. 4, the upper die part, or movable die, is guided in its vertical movement by guide posts 32 and 33.

Having thus described the invention, it will be apparent to those skilled in this art that various modifications and changes may be made in the illustrated embodiment thereof, without departing from either the spirit or the scope of the invention.

Therefore, what is claimed as new and desired to be secured by Letters Patent is:

A machine for forming a wedge nut from a flat metal blank of tear drop shape which comprises a lower main die member having an upwardly facing cavity therein of right angle shape in vertical section having a wedge-shaped portion of substantially semi-circular cross section and expanding in conic form toward the angle and an inclined wall at the large end of the wedge-shaped portion, a yoke mounted on the lower main die adjacent the wall of the cavity and having a horizontal guide opening therethrough extending lengthwise of the axis of the die cavity, an upper main die member having a downwardly extending projection complementary in form to that of the recess and of less extent in said vertical section and engageable with the blank, means for bringing the main dies toward each other to cause the projection to drive the blank into the cavity with the wide end of the blank engaging said wall and to shape the blank in the die cavity, a reciprocating die member mounted in and slidable along said guide opening, said reciprocating die member having a die face parallel to the wall of the cavity and an inclined cam face spaced therefrom, a pusher member attached to the upper main die member, said pusher member having an inclined face engageable with the inclined cam face of the reciprocating die as the main dies are brought toward each other and after the projection has engaged and partially shaped the blank, the reciprocating die being advanced into alignment with the wall when the main dies are closed to bend the wide end of the blank into alignment with the wall of the die cavity.

References Cited in the file of this patent

UNITED STATES PATENTS

| | | |
|---|---|---|
| 612,489 | Dean | Oct. 18, 1898 |
| 752,104 | Renn | Feb. 16, 1904 |
| 987,381 | Law | Mar. 21, 1911 |
| 1,037,277 | Martin | Sept. 3, 1912 |
| 1,795,518 | Sharp | Mar. 10, 1931 |
| 2,202,044 | Chambers et al. | May 28, 1940 |
| 2,314,574 | Dickerman | Mar. 23, 1943 |
| 2,596,734 | Skowron | May 13, 1952 |
| 2,616,314 | Zeller | Nov. 4, 1952 |

FOREIGN PATENTS

| | | |
|---|---|---|
| 159,904 | Switzerland | Apr. 1, 1933 |